April 14, 1970               A. SBRILLI            3,506,220
HORIZONTAL AXIS, FLAT LIFTING ROTOR AND
CONTROL SYSTEM FOR AIRCRAFT
Filed April 11, 1968                                          3 Sheets-Sheet 1

INVENTOR.
ANTHONY SBRILLI
BY
ATTORNEYS

April 14, 1970             A. SBRILLI             3,506,220
HORIZONTAL AXIS, FLAT LIFTING ROTOR AND
CONTROL SYSTEM FOR AIRCRAFT
Filed April 11, 1968                       3 Sheets-Sheet 2

INVENTOR.
ANTHONY SBRILLI
BY

ATTORNEYS

United States Patent Office 3,506,220
Patented Apr. 14, 1970

3,506,220
HORIZONTAL AXIS, FLAT LIFTING ROTOR AND
CONTROL SYSTEM FOR AIRCRAFT
Anthony Sbrilli, 2 Whitman Place,
Edison, N.J. 08817
Filed Apr. 11, 1968, Ser. No. 720,570
Int. Cl. B64c 27/32
U.S. Cl. 244—19
4 Claims

ABSTRACT OF THE DISCLOSURE

A horizontal axis, flat lifting rotor and control wing for aircraft, similar to helicopters and autogyros, that may be adapted for use as a toy for children, advertising devices, and as a form of a windmill when positioned in a windmill form. The invention includes a hollow wing having slotted recesses on opposite sides, and in which the wing element is rotated from an engine or motor source within the fuselage. It combines the proportion and support means of such aircraft.

---

The present invention relates to an improved horizontal axis, flat lifting rotor wing, and control therefor, for use as a helicopter and autogyro type aircraft, and achieving correspondingly improved flight characteristics thereof.

The invention relates particularly to slotted openings that are alternately opened and closed in forming valves as the wing element is rotated, so that air passes through such valves in the opened position for increasing and decreasing selectively the effective rotor surface area and thereby regulating the amount of lift that the pilot of such craft may desire.

A further object of the present invention is to provide an effective, collective pitch on a horizontal rotor means that achieves what is provided in a vertical shaft helicopter, by means of opening and closing sliding valves for increasing and decreasing correspondingly the rotor effective surface area thereof in regulating lift of such craft.

Figure 1:
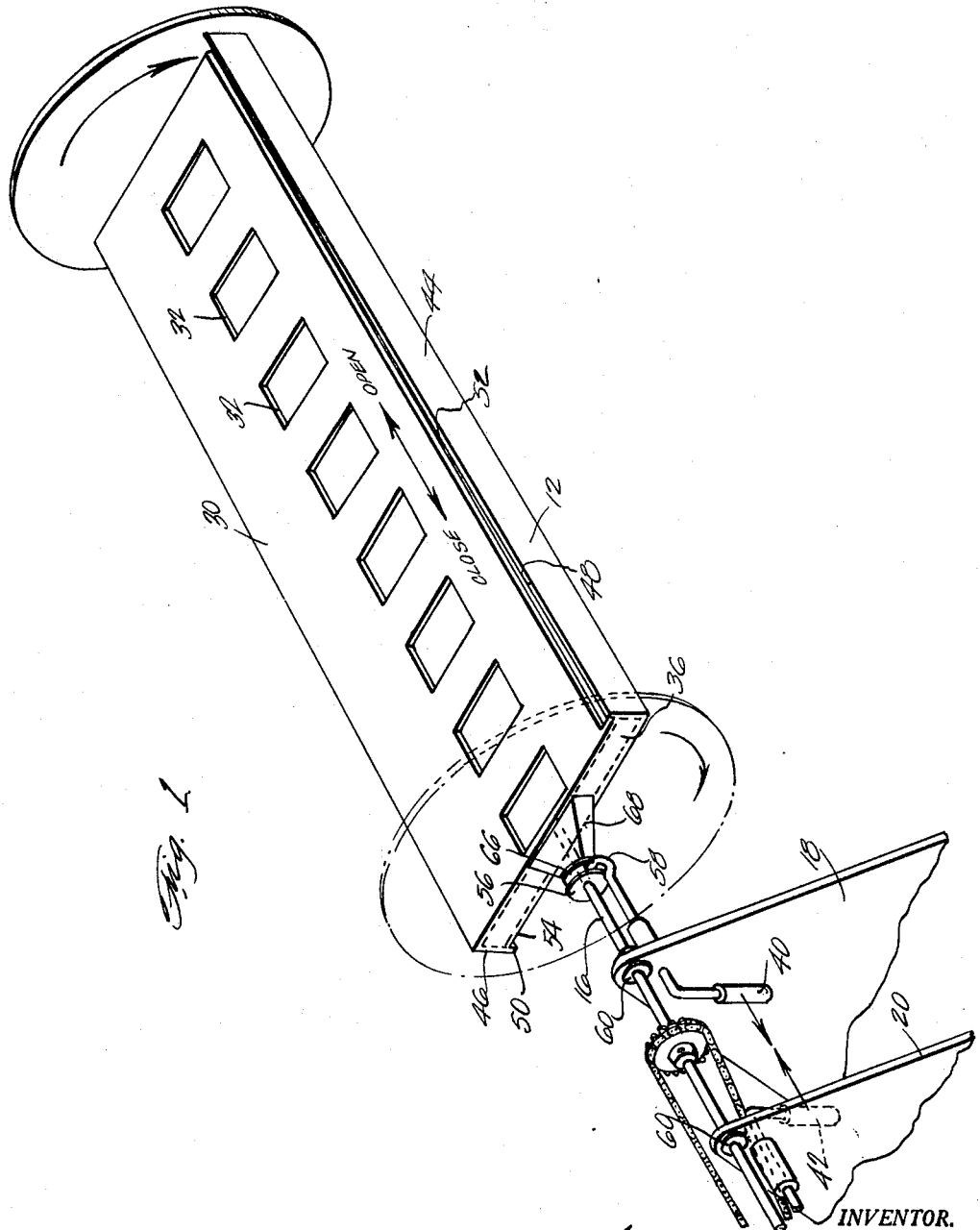
Figure 2:
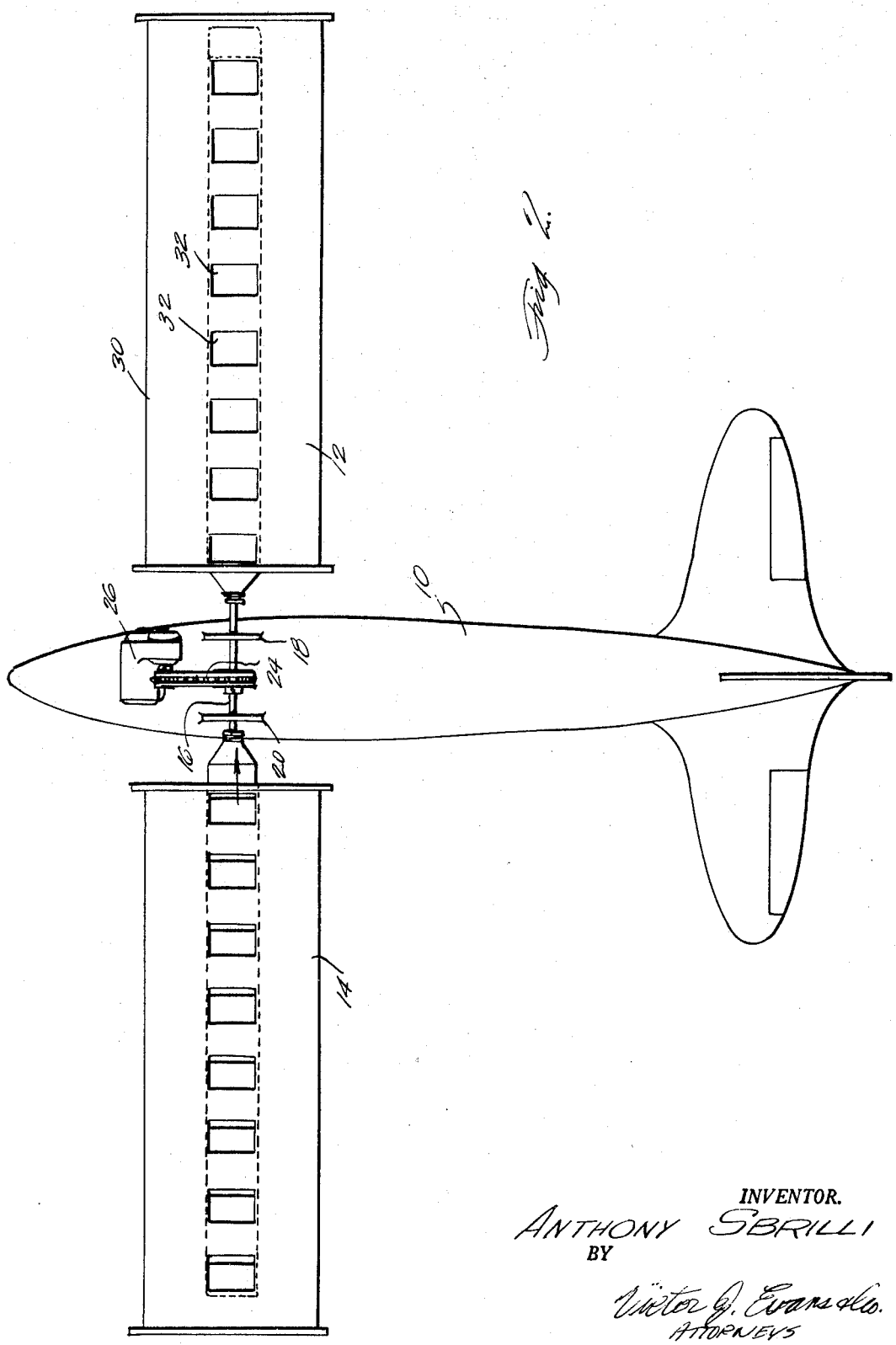

The above and other objects and advantages of the invention will become apparent on full consideration of the following detailed description and accompanying drawings in which:

FIG. 1 is a perspective view of a portion of an aircraft showing the horizontally disposed flat rotating rotor wing with the controls thereof for actuating the valves for sliding in straight slots over the area along the horizontal axis, and so that the slots and valves will remain in place, thus causing no substantial unbalance of the rotor, in accordance with the preferred embodiment of the present invention;

FIG. 2 shows a plan view of the aircraft embodying the preferred aspects and concepts of the present invention; and FIGS. 3-6, inclusive, illustrate various types of rotor cross-sections that may be used in embodiments of the preferred invention illustrated in FIGS. 1 and 2.

Referring now to the drawings, there is shown an aircraft fuselage 10 having horizontal axially disposed, flat lifting, rotating wing elements 12, 14, mounted along a rotating shaft 16, mounted from a frame element 18, 20, supported in the fuselage 10. The shaft 16 is seen driven by a chain belt or other belt means 24, by a motor 26, the motor 26 being mounted also in the fuselage 10.

The wing element or wing means 12, 14, are each seen to comprise a hollow wing cavity forming means 30, having along a longitudinal axis a series of slot apertures 32 of generally square or rectangular configuration, which are alternately opened and closed by a slotted valve means that rotates within the wing cavity, and in which the valve means 36 alternately opens aperture 32, so that the apertures at a given position along the wing element 30 are in an open or closed position, dependent upon the manual position of the slide stick 40, 46, respectively. See FIG. 1. On each of the trailing edges 44, 46 of the wing 30, there is a lip means 48, 50. The cross-sectional thickness of the rotor wing is about 12½ percent of chord. Also provided are air openings 52, 54, more particularly illustrated in FIG. 4. The lip 52 is of slightly greater width or thickness dimension than is that of the rotor, but may be slightly smaller thereof than that shown in FIG. 4.

The frame 18 includes a bearing 60 on which the shaft 16 rotates, and the frame 20 also includes a bearing similar to bearing 60.

The control sticks 40, 42 may be spread apart separately or positioned together, for controlling the aircraft flight laterally, and when together they control the altitude or elevation flight.

A thrust bearing 56 is engaged for sliding along the shaft 16 when controlled by the thrust engaging means 58 that is secured to the end of the stick 40. Thus, as the stick 40 is moved left or right, the bearing engaging means 58 moves the thrust bearing 56 correspondingly left or right, since the bearing engaging means 58 engages a groove 66 therein. Connected and secured to the bearing 56 is the slotted valve means 68 for causing opening and closing of the apertures 32, 32 accordingly.

Figure 3:
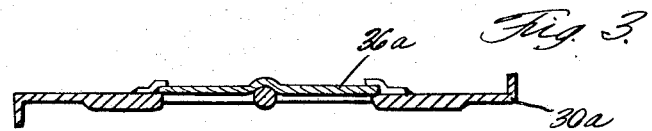
Figure 4:
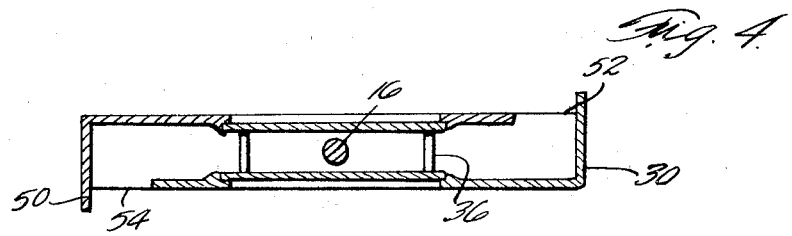
Figure 5:
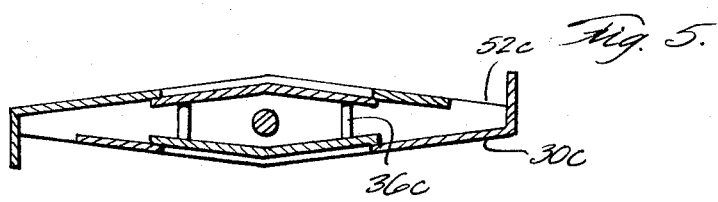
Figure 6:
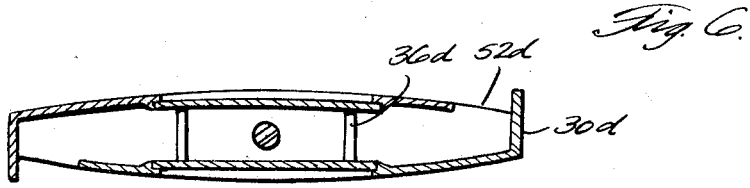

There are shown in FIGS. 3-6 various types of cross-sectional wing means that may be used for the rotor structures and in which the FIG. 3 shows a flat sheet type wing cavity construction for the rotor means. FIG. 4 is a box or flat rectangular cross-sectional wing means and is preferred since it is one of the cheaper types to manufacture, and provides more strength in use, FIG. 5 showing a modified or flat diamond type construction and in which FIG. 6 is of a symmetrical chordic type sectional wing means. All of the wing means of FIGS. 3-6 have a hollow portion within except that of FIG. 3, for allowing air to enter or exit from the wing cavity.

It is within the contemplation of the present invention to position the sliding valves 36 along a forward or intermediate portion of the wing means, but it is found that the most effective place found by experiment is along the axial section or center portion along the wing means as is illustrated in the drawings. The cross-section width of the valves is about one-third of the rotor cross-section. The valves are on at least one and preferably the upper and lower sides of the rotor wing means. The sliding valves may be of either square, rectangular or of round configuration, and it is within the purview of the present invention to use other modified forms of valves such as shutters, butterfly type valves, accordingly.

The sticks 40, 42 may be used for controlling the craft since they release or control the flow of air through the wing structure means, or another or further throttle control stick may be used by controlling the speed of the motor 26.

The distance of the movement of the control stick in a left-right movement is equal to the width of the valve opening in a corresponding direction.

The sticks 40, 42 may be used differentially for controlling the banking, turning, and other effects of the flight of the aircraft and during takeoff or climbing, the control sticks 40, 42 are fully closed together, since the most lift is achieved while the valves are closed. After the desired altitude is once obtained, and while the aircraft is airborne, the control sticks may be positioned so that the valves remain closed, or other selected positions may be used.

During landing of the aircraft, the control sticks are gradually spread apart and just before the aircraft touches down, they are both then brought together for the most efficient lift. The opening and closing of the valves in the wing means with the sticks 40, 42 is the same effect that the effective pitch stick of a vertical shaft helicopter achieves in opening and closing the sliding valves, for increasing and decreasing the rotor surface area, and therefore it is seen that the advantages and objects of the present invention of regulating the amount of lift that the pilot may desire, is performed.

Additional embodiments of the invention in this specification will occur to others and, therefore, it is intended that the scope of the invention be limited only by the appended claims and not by the embodiments described hereinabove. Accordingly, reference should be made to the following claims in determining the full scope of the invention.

What is claimed is:

1. A horizontally, axially disposed, generally flat, lifting rotor wing means for an aircraft comprising a cavity forming wing element axially mounted on a rotating shaft, said shaft being mounted transversely from a frame in a fuselage and extending on each side thereof, each trailing edge of said wing means having a lip and an elongated slot positioned along said lip also on said trailing portion of said wing means to allow the passage of air, said lip dirceting air from said slots tangentially to said rotor, a thrust bearing mounted on said shaft between the wing means and said frame in each side, a stick to displace axially each said thrust bearing selectively, a series of apertures extending through said wing means, and axially movable closure means for said apertures to control the quantity of air passing through the aperture series in response to displacement of said thrust bearing by said stick to control the lift of each wing and hence said aircraft.

2. The invention according to claim 1, wherein said wing means has a generally flat cross-section.

3. The invention according to claim 1, wherein said wing means has a generally diamond cross-section.

4. The invention according to claim 1, wherein said wing means has a generally chordic and symmetrical cross-section.

References Cited

UNITED STATES PATENTS

| 1,349,242 | 8/1920 | Warren | 244—43 |
| 1,816,898 | 8/1931 | Few | 244—19 |

MILTON BUCHLER, Primary Examiner

J. E. PITTENGER, Assistant Examiner

U.S. Cl. X.R.

170—155; 244—39, 43